(12) United States Patent
Rambetius

(10) Patent No.: US 11,722,091 B2
(45) Date of Patent: Aug. 8, 2023

(54) INVERTER, ELECTRIC DRIVE, VEHICLE AND METHOD FOR CONTROLLING CONTROLLABLE SWITCHES OF AN INVERTER AND CORRESPONDING COMPUTER PROGRAM PRODUCT

(71) Applicant: Valeo Siemens eAutomotive Germany GmbH, Erlangen (DE)

(72) Inventor: Alexander Rambetius, Erlangen (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 0 days.

(21) Appl. No.: 17/454,348

(22) Filed: Nov. 10, 2021

(65) Prior Publication Data

US 2022/0149768 A1    May 12, 2022

(30) Foreign Application Priority Data

Nov. 12, 2020    (DE) .................... 10 2020 214 224.6

(51) Int. Cl.
*H02P 1/00*    (2006.01)
*H02P 3/00*    (2006.01)
(Continued)

(52) U.S. Cl.
CPC .............. *H02P 29/66* (2016.02); *B60L 15/20* (2013.01); *H02M 7/5387* (2013.01); *H02P 27/06* (2013.01); *B60L 2210/42* (2013.01)

(58) Field of Classification Search
CPC .......... H02P 29/66; H02P 27/06; B60L 15/20; H02M 7/5387

(Continued)

(56) References Cited

U.S. PATENT DOCUMENTS 5,796,236 A * 8/1998  Royak .................... H02P 21/09
                                                            318/807
7,960,928 B2 * 6/2011  Tang ................... B60L 15/2045
                                                            318/578
(Continued)

FOREIGN PATENT DOCUMENTS

AT             522279 B1    12/2020
DE    102017220685 A1     5/2019
(Continued)

OTHER PUBLICATIONS

Extended European Search Report issued in European Application No. 21196254.3, dated Feb. 18, 2022 (8 pages).

(Continued)

*Primary Examiner* — Erick D Glass
(74) *Attorney, Agent, or Firm* — Osha Bergman Watanabe & Burton LLP

(57) ABSTRACT

The inverter (110) comprises input terminals (IT+, IT−), output terminals (OT), controllable switches (Q, Q') connected to the input terminals (IT+, IT−) and to the output terminals (OT) and a control device (116) configured to control the controllable switches (Q, Q') so as to convert a DC voltage at the input terminals (IT+, IT−) into an AC voltage at the output terminals (OT) intended to drive an asynchronous electric motor (108) to achieve a target torque (T*), selectively: in a first mode of operation in which the target torque (T*) is determined according to a torque determination method, and in response to a rotor temperature (Tr), in a second mode of operation in which losses in the rotor are decreased relative to the first mode of operation while the target torque (T*) remains determined according to the torque determination method of the first mode of operation.

8 Claims, 4 Drawing Sheets

Figure 1:
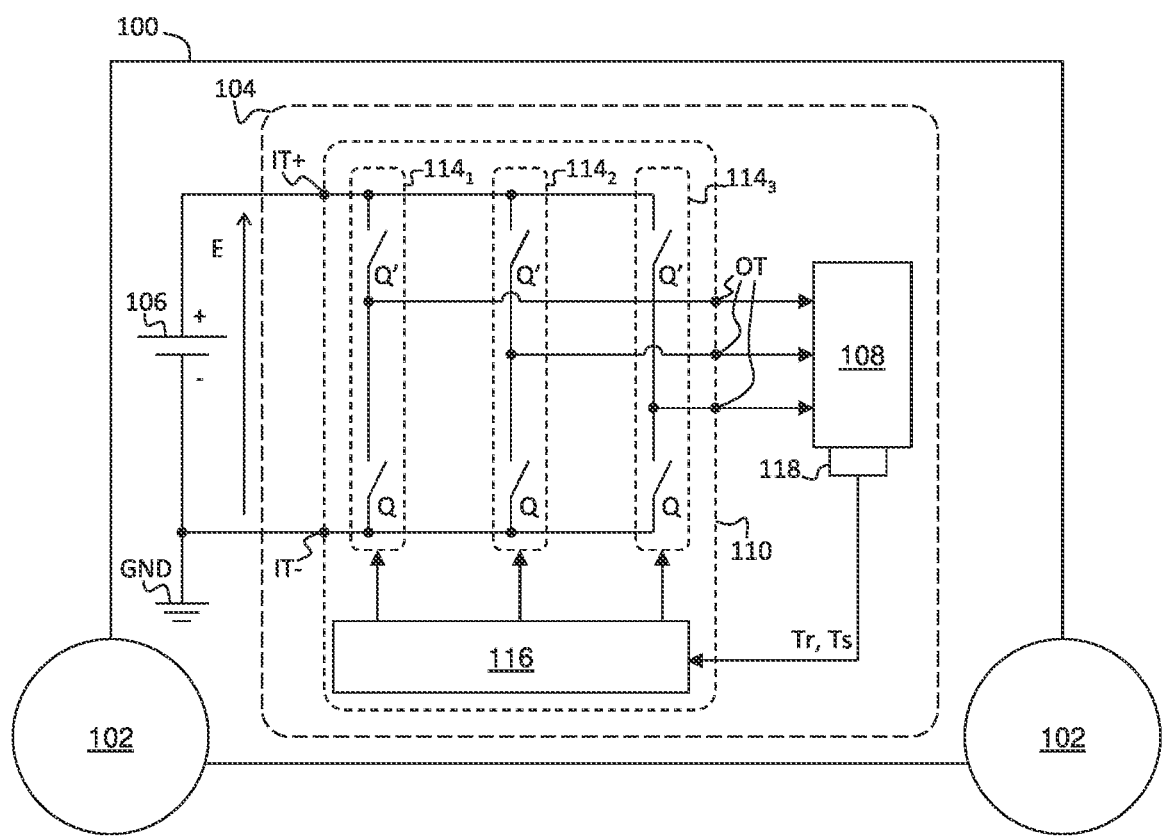

(51) Int. Cl.
  *H02P 5/00* (2016.01)
  *H02P 29/66* (2016.01)
  *B60L 15/20* (2006.01)
  *H02M 7/5387* (2007.01)
  *H02P 27/06* (2006.01)

(58) Field of Classification Search
  USPC ........................................................ 318/139
  See application file for complete search history.

(56) References Cited

U.S. PATENT DOCUMENTS

| | | | |
|---|---|---|---|
| 10,819,264 B1 | 10/2020 | Bojoi et al. | |
| 2009/0153087 A1 | 6/2009 | Lim et al. | |
| 2009/0284202 A1* | 11/2009 | Miura | G01K 7/42 |
| | | | 318/473 |
| 2010/0090629 A1* | 4/2010 | Tang | B60L 15/2045 |
| | | | 180/65.285 |
| 2012/0007532 A1* | 1/2012 | Baglino | H02P 21/14 |
| | | | 318/473 |
| 2012/0212169 A1 | 8/2012 | Wu et al. | |
| 2014/0346979 A1* | 11/2014 | Ota | H02P 21/08 |
| | | | 318/51 |
| 2015/0002054 A1 | 1/2015 | Frankstein | |
| 2017/0302205 A1 | 10/2017 | Goetting et al. | |
| 2019/0229665 A1 | 7/2019 | Kobayashi | |
| 2020/0313600 A1 | 10/2020 | Rosen et al. | |

FOREIGN PATENT DOCUMENTS

| | | |
|---|---|---|
| EP | 2963805 A1 | 1/2016 |
| JP | 2016082709 A | 5/2016 |
| WO | 2019/244370 A1 | 12/2019 |

OTHER PUBLICATIONS

German Search Report in corresponding German Application No. 10 2020 214 224.6, dated Jul. 16, 2021 (9 pages).

* cited by examiner

INVERTER, ELECTRIC DRIVE, VEHICLE AND METHOD FOR CONTROLLING CONTROLLABLE SWITCHES OF AN INVERTER AND CORRESPONDING COMPUTER PROGRAM PRODUCT

The present invention relates to an inverter, as well as an electric drive and a vehicle comprising such an inverter. The present invention also relates to a method for controlling controllable switches of an inverter and a corresponding computer program product. It is especially intended be used in an automotive vehicle.

Inverters are used to generate an AC voltage from a DC voltage provided, for instance, from a battery. The AC voltage may be used to drive an asynchronous electric motor comprising a stator and a rotor. In some circumstances, the rotor may overheat.

An object of the invention is to allow to prevent overheating of the rotor.

The object of the invention may be solved by an inverter comprising:
- input terminals;
- output terminals;
- controllable switches connected to the input terminals and to the output terminals;
- a control device configured to control the controllable switches so as to convert a DC voltage at the input terminals into an AC voltage at the output terminals intended to drive an asynchronous electric motor to achieve a target torque, selectively:
  - in a first mode of operation in which the target torque is determined according to a torque determination method, and
  - in response to a rotor temperature, in a second mode of operation in which losses in the rotor are decreased relative to the first mode of operation while the target torque remains determined according to the torque determination method of the first mode of operation.

Thanks to the invention, the rotor temperature may be reduced with the reduction of the rotor losses in the second mode of operation, without changing the target torque relative to the first mode of operation.

This is advantageous with respect to the solution consisting in reducing the torque when either the stator or the rotor is too hot. In fact, reducing the torque would result in a reduction of the stator losses as well as in a reduction of the rotor losses However, in particular for electric vehicles where the wheels are driven by the motor, a loss of torque would result in a loss of acceleration, which could impact ease of driving or even security, for instance when torque is needed for taking over a truck. Furthermore, the invention may also allow to simplify a rotor cooling system.

Some further optional features of the invention which can be used together or separately are developed below.

In the second mode of operation, the control device may be configured to control the controllable switches in order to increase loses in a stator of the motor, relative to the first mode of operation.

In the second mode of operation, the control device may be configured to control the controllable switches in order to decrease a slip of the motor, relative to the first mode of operation.

In the second mode of operation, the control device may be configured to control the controllable switches in order to decrease a stator quadrature current, relative to the first mode of operation. With this feature, the invention may be easily implemented because the direct and quadrature current are parameters that are generally controlled to drive the motor.

The control device may be configured to pass from the first mode of operation to the second mode of operation when the rotor temperature passes above a predefined threshold. This feature offers a simple condition to switch to the second mode of operation to avoid overheating of the rotor.

The control device may be configured to pass from the first mode of operation to the second mode of operation according to a stator temperature of the motor, in addition to the rotor temperature. With this feature, it is possible to avoid switching to the second mode of operation in situations it could be at the expense of the stator.

The control device may be configured to pass from the first mode of operation to the second mode of operation when the stator temperature is under a predefined threshold. This feature offers a simple condition to switch to the second mode of operation to avoid overheating of the rotor, while ensuring that the stator is able to support the second mode of operation.

In the first mode of operation, the control device may be configured to control the controllable switches according to a Maximum Torque Per Ampere method to reach the torque target. With this feature, when the rotor temperature is considered normal, an efficient control of the motor may be achieved.

The invention also relates to an electric drive comprising an inverter according to the invention and an electric motor driven by the inverter. The motor is preferably an induction motor.

The invention also relates to a vehicle comprising wheels and an electric drive according to the invention for driving, at least indirectly, at least one of the wheels.

The invention also relates to a method for controlling controllable switches of an inverter, the controllable switches being connected to input terminals and to output terminals of the inverter, the method comprising controlling the controllable switches so as to convert a DC voltage at the input terminals into an AC voltage at the output terminals intended to drive an asynchronous electric motor to achieve a target torque:
- in a first mode of operation in which the target torque is determined according to a torque determination method, and
- in response to a rotor temperature, in a second mode of operation in which losses in the rotor are decreased relative to the first mode of operation while the target torque remains determined according to the torque determination method of the first mode of operation.

The invention also relates to a computer program product comprising instructions which, when the program is executed by a computer, cause the computer to carry out a method for controlling an inverter according to the invention.

Figure 2:
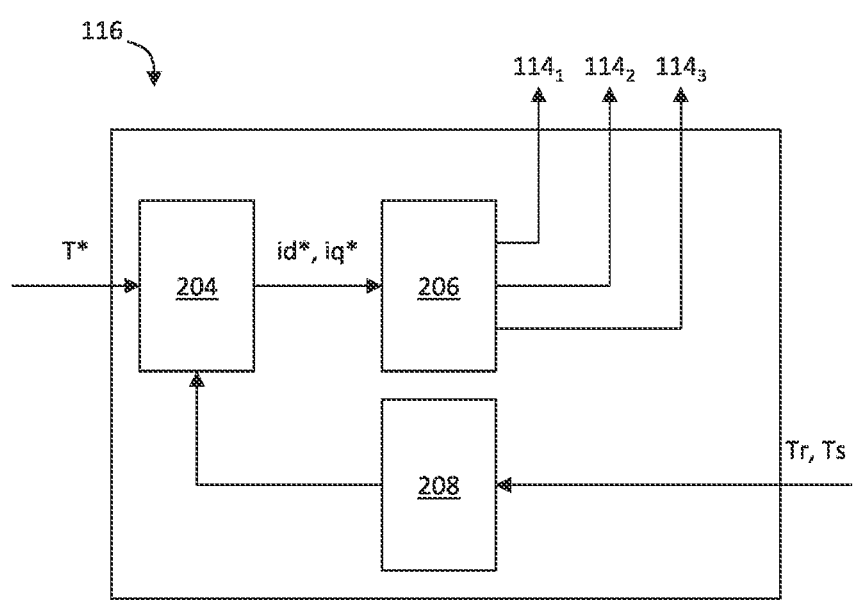
Figure 3:
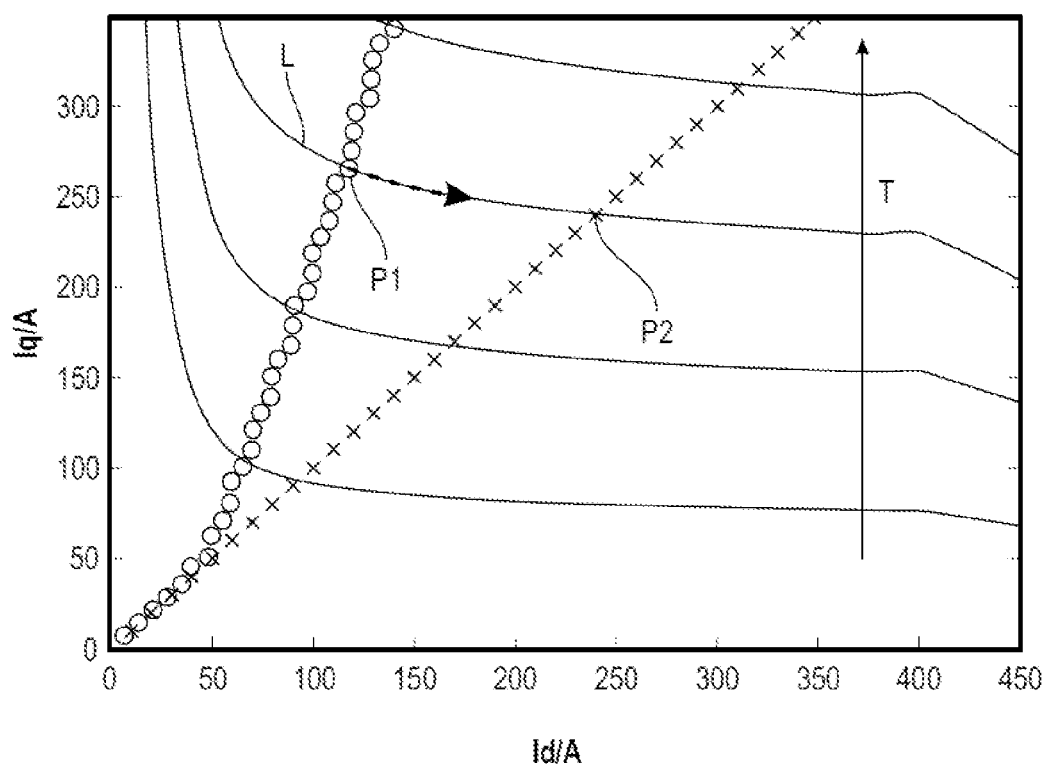
Figure 4:
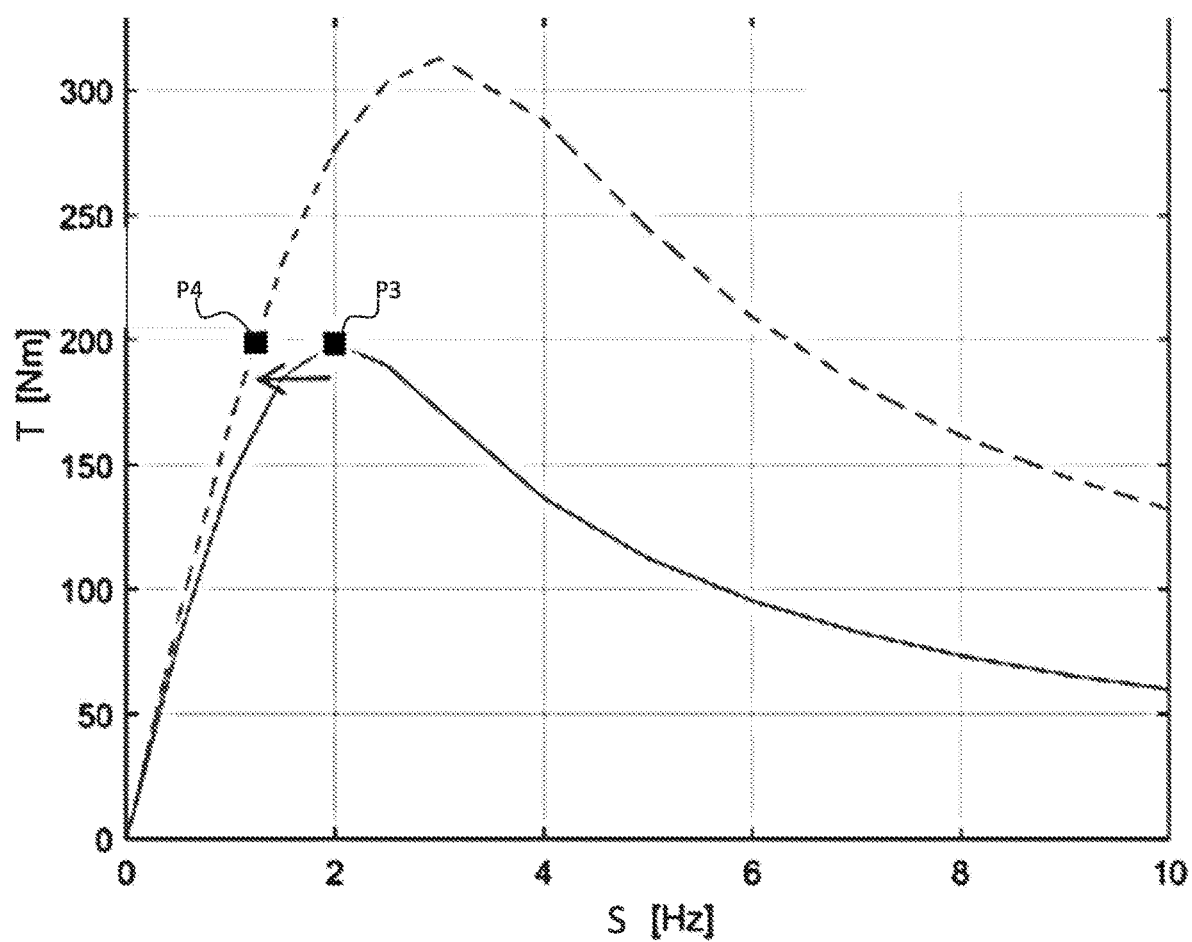

The present invention will be described more specifically with reference to the following drawings, in which:

FIG. 1 is a schematic view showing an embodiment of a vehicle comprising an inverter according to the invention, FIG. 2 is an example of implementation of the inverter of FIG. 1, FIG. 3 is a graph showing a torque of a motor driven by the inverter, as a function of a direct and quadrature current of the motor, and FIG. 4 is a graph the torque versus a slip of the motor, for two different mode of operation of the inverter.

Referring to FIG. 1, a vehicle 100 according to the invention will now be described. In the described example, the vehicle 100 is an automotive vehicle.

The vehicle 100 comprises wheels 102 and an electric drive 104 configured to drive at least one of the wheels 102 at least indirectly. The vehicle 100 further comprises a DC voltage source 106, such as a battery, for electrically powering the electric drive 104. The DC voltage source 106 is configured to provide a DC voltage E.

The electric drive 104 comprises an electric asynchronous motor 108 and an inverter 110 configured to drive the motor 108, for instance by supplying electric power. For example, the motor 108 is a rotary electric motor comprising a stator and a rotor configured to rotate around a rotation axis with respect to the stator. The motor has a main inductance Lh. For the embodiment described, the motor 108 is an induction motor.

The stator is provided with stator phases. In the described example, the motor 108 is a three-phase electric motor comprising three stator phases. The stator 108 has p pole-pairs of phases.

The inverter 110 is intended to drive the motor so that phase currents flows respectively in the stator phases, so as to produce a rotating magnetic field rotating around the rotation axis. This stator currents may be considered as vectors so that the resulting current vector may be expressed in a rotating frame through a direct-quadrature-zero (DQZ) transformation or equivalent transformations, as direct current id and quadrature current iq.

Since the motor 108 is an induction motor for the present embodiment, the rotor must rotate at a speed lower than a speed the magnetic field in order to produce torque. This difference is defined as the slip of the motor 108, expressed for example as a frequency difference.

The inverter 110 comprises input terminals IT+, IT− connected to the DC voltage source 106 so that the DC voltage E is present at the input terminals IT+, IT−. More precisely, the input terminals IT+, IT− include a positive input terminal IT+ connected to a positive terminal of the DC voltage source 106 and a negative input terminal IT− connected to a negative terminal of the DC voltage source 106 and to an electrical ground GND.

The inverter 110 further comprises output terminals OT connected to the motor 108. An AC voltage is intended to be present at the output terminals OT for powering the electric motor 108. The AC voltage may be a single or a multiphase AC voltage. In the described example where the motor 108 is a three-phase electric motor, the AC voltage is a three-phase AC voltage.

The inverter 110 further comprises controllable switches Q, Q', called main switches, connected to the input terminals IT+, IT− and to the output terminals OT. The main switches Q, Q' may be semi-conductor switches comprising for example transistors. Each main switch Q, Q' comprises for example one amongst: a Metal Oxide Semiconductor Field Effect Transistor (MOSFET), an Insulated Gate Bipolar Transistor (IGBT) and a Silicon Carbide MOSFET (SiC MOSFET).

In the described example, the inverter 110 comprises switch legs $114_{1-3}$ respectively associated to the stator phases of the motor 108. Each switch leg $114_{1-3}$ comprises a high side (HS) main switch Q' connected to the positive input terminal IT+ and a low side (LS) main switch Q connected to the negative input terminal IT−. The HS main switch Q' and the LS main switch Q are connected to each other at a middle point connected to the output terminal OT connected to the associated stator phase of the motor 108.

Each switch leg $114_{1-3}$ is intended to be controlled to commute between two configurations. In the first one, called high side (HS) configuration, the HS main switch Q' is closed (on) and the LS main switch Q is open (off) so that the DC voltage E is essentially applied to the associated stator phase. In the second one, called low side (LS) configuration, the HS main switch Q' is open (off) and the LS main switch Q is closed (on) so that a zero voltage is essentially applied to the associated stator phase.

The inverter 110 further comprises a control device 116 configured to control the main switches Q, Q' such that the main switches Q, Q' convert the DC voltage E into the AC voltage. In the described example, the control device 116 is configured to commute each switch leg 114 between the two configurations mentioned above.

The electric drive 104 may further comprise temperature sensors for respectively measuring a temperature Tr of the rotor and a temperature Ts of the stator.

Alternatively, the rotor temperature Tr and the stator temperature Ts could be estimated instead of being measured.

Referring to FIG. 2, an example of control device 116 will now be described. In the following description, only the features of the control device 116 useful to understand the invention are described.

The input signal for the control device 116 is a torque target T* which may be, for instance, provided by controlling a "gas" pedal of the vehicle 100.

The control device 116 further comprises a current determination module 204 configured to determine a stator direct current target id* and a stator quadrature current target iq* from the torque target T*.

The control device 116 further comprises a command determination module 206 configured to determine commands for the switch legs $114_{1-3}$ from the direct and quadrature current targets id*, iq*. These commands are intended to make the switch legs $114_{1-3}$ switch between their HS and LS configurations, so that the stator currents reach the targets id*, iq*. For example, the commands are determined according to a space vector modulation.

The control device 116 is configured to switch from a normal mode of operation to a safeguard mode of operation according to the rotor temperature Tr and, in the described example, the stator temperature Ts.

To this end, the control device 116 further comprises, in the described example, a temperature monitor module 208 for monitoring the rotor temperature Tr (measured or estimated) and, in the described example, the stator temperature Ts (measured or estimated). When the module 208 detects that the rotor temperature becomes high (e.g. passes above a predefined threshold) and the stator temperature is low (e.g. is under a predefined threshold), the control device passes from the normal mode of operation to the safeguard mode of operation.

More precisely, in the described example, in the normal mode of operation, the target torque T* is determined according to a torque determination method independent of the rotor temperature Tr, while the current determination module 204 determines the current targets id*, iq* according to a normal current determination method. For example, this normal current determination method is a Maximum Torque Per Ampere (MTPA) method.

In the safeguard mode of operation, the torque is determined by the same torque determination method than in the normal mode of operation. In this manner, the determined target torque is the same in the normal mode of operation and in the safeguard mode of operation. In particular, during switching of the mode of operation, the torque target T* stays substantially constant if the conditions to determine the torque target T* stay substantially the same. However, in the safeguard mode of operation, the current determination module 204 determines the current targets id*, iq* so as to decrease the rotor losses relative to the normal mode of operation, while still achieving the target torque T*. For instance, the current determination module 204 determines the current targets id*, iq* so as to decrease the slip.

More precisely, decreasing the slip may be achieved by changing the operating point of the motor, for instance by decreasing the quadrature current iq Besides, the torque T of the asynchronous motor 108 can be expressed by the equation: $T=(3/2)*p*Lh(id)*id*iq$, where p is the number of pole-pairs of the stator and Lh is the main inductance of the motor 108 (which may be a function of the direct current id). As can be seen from this equation, a same torque can be reached through various values of direct current id and quadrature current iq. As a result, it is possible to decrease the quadrature current iq while still achieving the desired torque.

Therefore, in the described example, the current determination module 204 determines the current targets id*, iq* so as to decrease the quadrature current target iq* in the safeguard mode of operation relative to the normal mode of operation, while keeping the same torque target T* than in the normal mode of operation. It results that the direct current target id* is increased to compensate the decrease of the quadrature current target iq*.

FIG. 3 illustrates the torque T according to the direct and quadrature currents iq, id. More precisely, isotorque lines (such as the line L) are illustrated. The torque T increases in the direction indicated by the solid arrow. FIG. 3 also illustrates MTPA points (circles) and equal direct and quadrature current points (crosses).

Considering that the target torque T* is the one of the isotorque line L, in the normal mode of operation, the current determination module 204 would for example achieve MTPA and therefore select the direct and quadrature current targets of point P1. On the contrary, in the safeguard mode operation, the current determination module 204 would select another point of isotorque line L with a decreased quadrature current target iq*, i.e. on the portion of the isotorque line L indicated by a dashed arrow on FIG. 3. For example, the current determination module 204 could be configured to set the direct and quadrature current targets as equals and therefore select the direct and quadrature current targets of point P2. In fact, as illustrated on FIG. 3, except for very low torque (where overheat is not likely to occur), the equal direct and quadrature currents points have a decreased quadrature current relative to MTPA points.

Therefore, the current determination module 204 may be configured to set the direct and quadrature current targets as equals in the safeguard mode of operation.

FIG. 4 illustrates the torque T according to the slip S, in case of MTPA (solid line) and in case a predefined maximum stator current Imax is reached, i.e. $id^2+iq^2=Imax^2$. Imax is usually determined by the inverter 100 and its maximum current capability. It can also be determined by the motor or by a project-requirements.

In the example given on FIG. 2, in case of MPTA, the stator current is ⅔ of the maximum stator current Imax and the torque is 198 Nm and achieved for a slip of 2 Hz (point P3).

When using setting the stator current (i.e. $\sqrt{(id^2+iq^2)}$) to the maximum stator current Imax, a lower slip 1,242 Hz may be used to maintain the torque at 198 Nm (point P4). This decreased slip leads in this example to a 40% decrease of the rotor losses. As a result, the temperature of the rotor may decrease. This is at the expenses of the stator losses which, in the described example, are increased by 225% so that the stator temperature may increase. However, depending on the situation, such temperature increase may be considered acceptable, especially as the stator may be more easily cooled than the rotor.

Therefore, the current determination module 204 may be configured to set the direct and quadrature current targets to reach the maximum stator current, with a slip allowing to reach the torque target T*.

The control device 116 may comprise a computer device comprising a data processing unit (such as a microprocessor) and a main memory accessible by the processing unit. The computer device further comprises a computer program containing instructions for the processing unit, to implement the functions of the previously described modules.

This computer program is for example intended to be loaded into the main memory, so that the processing unit may execute its instructions. Alternatively, all or part of these modules could be implemented in the form of hardware modules, that is to say in the form of an electronic circuit, for example micro-wired, not involving a computer program.

It will be noted that the invention is not limited to the embodiments described above. It will indeed appear to those skilled in the art that various modifications can be made to the embodiments described above, in the light of the teaching which has just been disclosed.

For example, the torque target T* may not be explicitly determined by the control device 116. For example, the control device 116 could be configured to determine the direct and quadrature current targets id*, iq* directly from the speed target and the speed of the rotor.

In the previous detailed description of the invention, the terms used should not be interpreted as limiting the invention to the embodiments presented in the present description, but should be interpreted to include all the equivalents within the reach of those skilled in the art by applying their general knowledge to the implementation of the teaching which has just been disclosed.

The invention claimed is:

1. An inverter comprising:
   input terminals;
   output terminals;
   controllable switches connected to the input terminals and to the output terminals;
   a control device configured to control the controllable switches so as to convert a DC voltage at the input terminals into an AC voltage at the output terminals configured to drive an asynchronous electric motor to achieve a target torque,
   wherein in a first mode of operation of the control device the target torque is determined according to a torque determination method,
   wherein the control device passes from the first mode of operation to a second mode of operation when a rotor temperature passes above a first predefined threshold and a stator temperature is below a second predefined threshold, the first predefined threshold being defined to prevent overheating of the rotor and the second predefined threshold being defined to maintain an acceptable stator temperature, and
   wherein in the second mode of operation the control device is configured to control the controllable switches to decrease a slip of the motor and decrease losses in the rotor relative to the first mode of operation while the target torque remains determined according to the torque determination method of the first mode of operation.

2. The inverter according to claim 1, wherein, in the second mode of operation, the control device is configured to control the controllable switches to increase loses in a stator of the motor, relative to the first mode of operation.

3. The inverter according to claim 1, wherein, in the second mode of operation, the control device is configured to control the controllable switches in order to decrease a stator quadrature current, relative to the first mode of operation.

4. The inverter according to claim 1, wherein, in the first mode of operation, the control device is configured to control the controllable switches according to a Maximum Torque Per Ampere method to reach the torque target.

5. An electric drive comprising:
an inverter according to claim 1; and
an electric motor driven by the inverter.

6. A vehicle comprising wheels and an electric drive according to claim 5 for driving, at least indirectly, at least one of the wheels.

7. A method for controlling controllable switches of an inverter, the controllable switches being connected to input terminals and to output terminals of the inverter, the method comprising:

controlling, using a control device, the controllable switches so as to convert a DC voltage at the input terminals into an AC voltage at the output terminals configured to drive an asynchronous electric motor to achieve a target torque;

determining, in a first mode of operation of the control device, the target torque according to a torque determination method;

passing the control device from the first mode of operation to a second mode of operation when the rotor temperature passes above a first predefined threshold and the stator temperature is below a second predefined threshold, the first predefined threshold being defined to prevent overheating of the rotor and the second predefined threshold being defined to maintain an acceptable stator temperature; and controlling, in the second mode of operation of the control device, the controllable switches to decrease a slip of the motor and decrease losses in the rotor relative to the first mode of operation while the target torque remains determined according to the torque determination method of the first mode of operation.

8. A computer program product comprising instructions which, when the program is executed by a computer, cause the computer to carry out a method for controlling an inverter according to claim 7.

* * * * *